April 14, 1925.

H. P. FOLLAND ET AL 1,533,844

SHOCK ABSORBER SUITABLE FOR USE ON AIRCRAFT

Filed Nov. 20, 1924

Inventors

H. P. FOLLAND
H. E. PRESTON,

By their Attorneys,
Baldwin Wright

Patented Apr. 14, 1925.

1,533,844

UNITED STATES PATENT OFFICE.

HENRY PHILLIP FOLLAND AND HENRY EDWARD PRESTON, OF CHELTENHAM, ENGLAND, ASSIGNORS TO THEMSELVES AND THE GLOUCESTERSHIRE AIRCRAFT COMPANY, LIMITED, OF CHELTENHAM, ENGLAND.

SHOCK ABSORBER SUITABLE FOR USE ON AIRCRAFT.

Application filed November 20, 1924. Serial No. 751,159.

*To all whom it may concern:*

Be it known that we, HENRY PHILLIP FOLLAND and HENRY EDWARD PRESTON, both subjects of the King of Great Britain, residing at Sunningend Works, Cheltenham, England, have invented new and useful Improvements in Shock Absorbers Suitable for Use on Aircraft, of which the following is a specification.

This invention relates to rubber shock absorbers and its object is to provide a shock absorber which shall be of such a shape that its resistance to the air is reduced to a minimum, whilst its shock absorbing quality may be as great as possible, and which may be of simple and cheap construction.

According to our invention, we construct a shock absorber of a number of rubber pads alternating with metal plates which separate the pads from one another, the pads and plates being threaded on two or more tubes which act as guides for the pads and plates. The external contour of a pad is such that the whole may be enclosed in a streamline casing of minimum width.

The tubes and pads are preferably so arranged that the width of the rubber surrounding each tube is approximately constant, so that an approximately equal distribution of pressure is obtained.

Preferably we employ three guide tubes, the axes of which lie in a fore and aft plane, the centre tube, which forms the main member, receiving the load. This centre tube may contain a dashpot or its equivalent.

Figure 1:
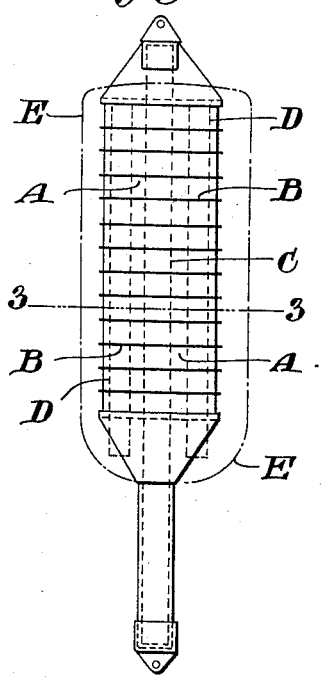
Figure 2:
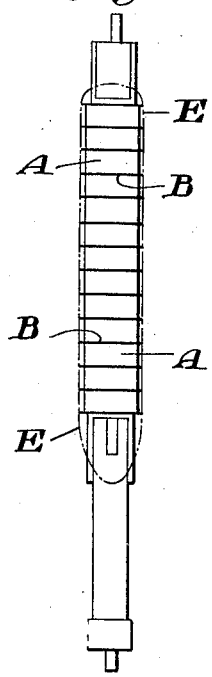
Figure 3:
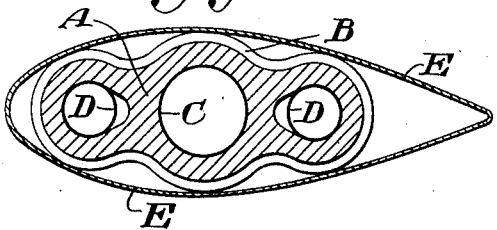
Figure 4:
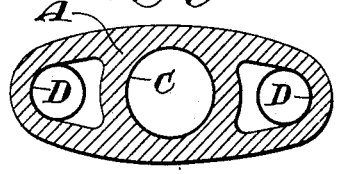

Our invention is illustrated by the accompanying drawing, Figure 1 of which is a side view, Figure 2 a front view, Figure 3 a section on the line 3—3 of Figure 1, and Figure 4 a similar section of a modified form of pad.

A A are pads of rubber separated by metal plates B B, the whole assemblage of pads and plates being threaded upon a central tube C which receives the load and also upon two guide rods D D, the whole being surrounded by a streamline casing E indicated by dotted lines.

What we claim is:—

1. A shock absorber for use on aircraft comprising a plurality of tubes, alternating rubber pads and metal plates threaded on said tubes and a stream line casing enclosing the assemblage of parts and plates.

2. A shock absorber for use on aircraft comprising a central tube, smaller tubes at the side of and parallel therewith, alternating rubber pads and metal plates threaded on said tubes and a stream line casing enclosing the assemblage of parts and plates.

3. A shock absorber for use on aircraft comprising a central tube, smaller tubes adjacent thereto and parallel therewith, alternating rubber pads and metal plates threaded on said tubes, the thickness of the rubber surrounding each tube being approximately constant and a stream line casing enclosing the assemblage of parts and plates.

In testimony that we claim the foregoing as our invention we have signed our names this 1st day of September, 1924.

HENRY PHILLIP FOLLAND.
HENRY EDWARD PRESTON.